UNITED STATES PATENT OFFICE.

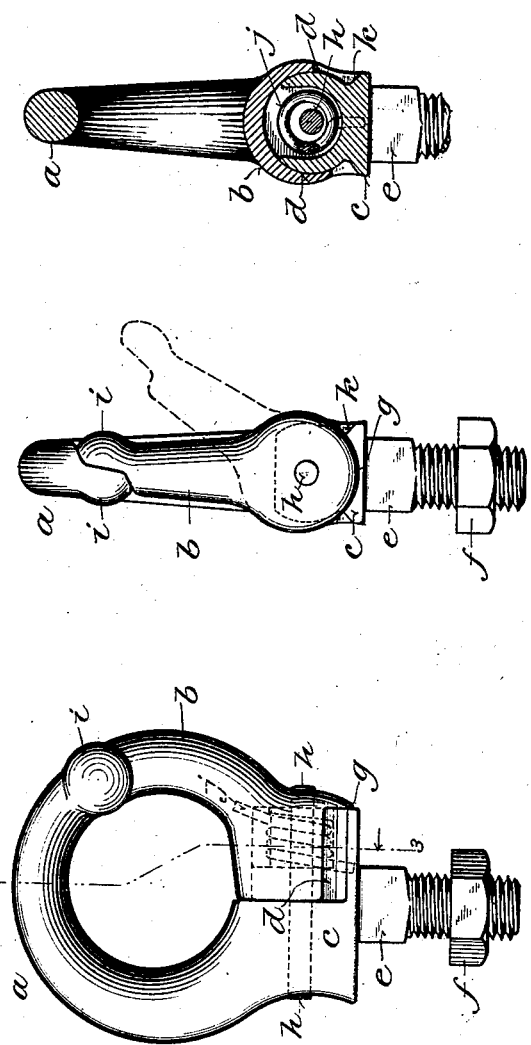

ORIN C. DAVIS, OF MANISTEE, MICHIGAN, ASSIGNOR OF ONE-HALF TO RICHARD G. PETERS, OF MANISTEE, MICHIGAN.

CHECK-HOOK.

No. 898,443.  Specification of Letters Patent.  Patented Sept. 15, 1908.

Application filed March 19, 1908. Serial No. 422,065.

*To all whom it may concern:*

Be it known that I, ORIN C. DAVIS, a citizen of the United States, residing at Manistee, in the county of Manistee and State of Michigan, have invented certain new and useful Improvements in Check-Hooks, of which the following is a specification, reference being had to the accompanying drawing, forming a part thereof.

This invention relates to check hooks for harness.

The main objects of the invention are to prevent accidental release of the check-rein from the hook; to facilitate engaging the check-rein with the hook and disengaging it therefrom; and generally to improve the construction and increase the utility and convenience of devices of this kind.

It consists in certain novel features of construction and in the peculiar arrangement and combinations of parts as hereinafter particularly described and defined in the claims.

In the accompanying drawing like characters designate the same parts in the several figures.

Figure 1 is a side view on a somewhat enlarged scale of a check hook embodying the present invention; Fig. 2 is a rear view of the same, as viewed from the right with reference to Fig. 1; and Fig. 3 is a vertical cross section on the line 3 3, Fig. 1.

The device comprises a hook $a$, which is preferably of semi-circular or curved form, and a laterally swinging pivoted latch $b$ which is also preferably curved so as to form with the hook a continuous and approximately circular ring, as shown in Fig. 1.

The hook $a$ has an extended base $c$, the rear portion of which is formed with a hollow or recessed semi-circular bearing $d$. On the under side the base $c$ of the hook is formed with a square stem $e$, which is threaded at its lower end and provided with a nut $f$ for securely fastening the check hook to the saddle of a harness in the usual way.

The shank of the latch $b$ is formed with a semi-cylindrical recess which fits over and is adapted to turn on the bearing $d$, as shown in Fig. 3. At its rear end it is closed and laps the rear end of the base $c$, as shown at $g$ in Figs. 1 and 2.

The latch $b$ is secured to the hook $a$ by a pivot pin $h$ passing through the shank of the latch and the base $c$ of the hook, horizontally and axially with relation to the bearing $d$, and headed or upset at the ends.

The hook and latch preferably terminate in semi-spherical knobs $i$, being halved or scarfed to form a lapped joint, as shown in Fig. 2.

A spiral spring $j$ surrounding the pivot pin $h$ and engaged at one end with a hole in the base $c$ of the hook and at the other end with a hole in the latch $b$, tends to close the latch and hold its free end against the opposing end of the hook $a$. The spring is completely inclosed by the recessed base of the hook and shank of the latch. A shoulder $k$ on one side of the base $c$ serves as a stop by engagement with the adjacent edge of the shank of latch $b$ to limit the opening of the latch and thus to prevent overstraining the spring $j$. The bearing $d$ affords an extended support for the pivoted latch $b$ and relieves the pivot pin $h$ of strain.

By simply pressing the latch $b$ to one side, as indicated by dotted lines on Fig. 2, the device is opened and the check-rein may be slipped into or out of the hook. This can be readily accomplished with one hand. In taking the check-rein off the hook it may be drawn back and down upon the latch $b$ and then pulled or thrust to one side, thereby opening the latch, from which it is then readily withdrawn.

In placing the check-rein upon the hook, the looped end of the rein may be crowded sidewise against the latch so as to open the same, and then slipped upwardly and forwardly over the end of the hook. In either case the latch is automatically closed as soon as it is relieved from pressure by the spring $j$. The latch normally closing the opening into the hook, serves as a keeper to prevent accidental disengagement of the check-rein from the hook.

I claim:

1. A check hook comprising a hook having a recessed base, a latch having a recessed shank pivoted to the base of the hook on a horizontal axis which coincides with the longitudinal axis of the recesses in the base of the hook and in the shank of the latch, and a spring inclosed by the recessed base of the hook and the recessed shank of the latch and tending to close the latch, substantially as described.

2. A check hook comprising a hook having a base formed with a semi-cylindrical recessed bearing, a latch having a shank formed with a semi-cylindrical recess fitting over and pivotally mounted on said bearing, and a spring inclosed by the recessed base of the hook and the recessed shank of the latch and tending to close the latch, substantially as described.

3. A check hook comprising a hook having a base formed with a fastening stem and with a semi-cylindrical recessed bearing, a latch having a shank formed with a semi-cylindrical recess fitting said bearing, a spiral spring inclosed by the base of the hook and the shank of the latch and having its ends engaged therewith so as to normally hold the latch closed, and a pivot pin connecting the shank of the latch with the base of the hook and extending transversely to the stem on the base, substantially as described.

4. A check hook comprising a curved hook having an extended base formed with a semi-cylindrical recessed bearing and a fastening stem projecting downwardly therefrom perpendicular to the axis of said bearing, a curved latch adapted to close the opening into the hook and formed with a semi-cylindrical recess fitted on said bearing, a spiral spring inclosed by the base of the hook and the shank of the latch and engaged at the ends therewith so as to hold the latch normally closed, and a pivot pin passing through said spring and connecting the latch and hook axially with relation to said bearing, substantially as described.

In witness whereof I hereto affix my signature in presence of two witnesses.

ORIN C. DAVIS.

Witnesses:
 JNO. S. WATSON,
 RAY DAVIS.